United States Patent [19]

Grabos

[11] Patent Number: 4,545,102
[45] Date of Patent: Oct. 8, 1985

[54] TOOLING FOR AND METHOD OF FABRICATING MASTER MODELS

[75] Inventor: Fred F. Grabos, Seattle, Wash.

[73] Assignee: The Boeing Company, Seattle, Wash.

[21] Appl. No.: 510,147

[22] Filed: May 23, 1983

[51] Int. Cl.⁴ .................. B23Q 17/00; B23Q 3/00; A61B 5/08

[52] U.S. Cl. .................... 29/407; 29/464; 29/467; 33/562

[58] Field of Search .............. 29/407, 464, 467; 33/1 R, 174 G

[56] References Cited

U.S. PATENT DOCUMENTS

| | | | |
|---|---|---|---|
| 1,171,818 | 2/1916 | Walpole. | |
| 1,904,674 | 4/1933 | Blumenthal. | |
| 2,274,060 | 2/1942 | Hart | 18/44 |
| 2,705,375 | 4/1955 | Foreman et al. | 33/174 |
| 2,755,510 | 7/1956 | Rauter | 18/14.5 |

Primary Examiner—Howard N. Goldberg
Assistant Examiner—Steven Nichols
Attorney, Agent, or Firm—Morris A. Case; Nicolaas DeVogel; Bernard A. Donahue

[57] ABSTRACT

An index bar is secured to a machined and leveled surface of a base. One side of the bar is machined to be contacted and to act as a buttock plane. The bar has a series of in line holes positioned for lengthwise indexing. A second index bar, secured to the base, has a series of matching holes and the bar is positioned parallel to the buttock plane. The index bars are used for alignment for scribing header locations on the base. Headers, contoured with respect to the base surface and with respect to the buttock plane, are formed and while on the scribed line and while contacting the base and the buttock plane surface, are secured to the base. The secured headers are vertically aligned and held in that position to provide the critical lines for forming a master model.

17 Claims, 8 Drawing Figures

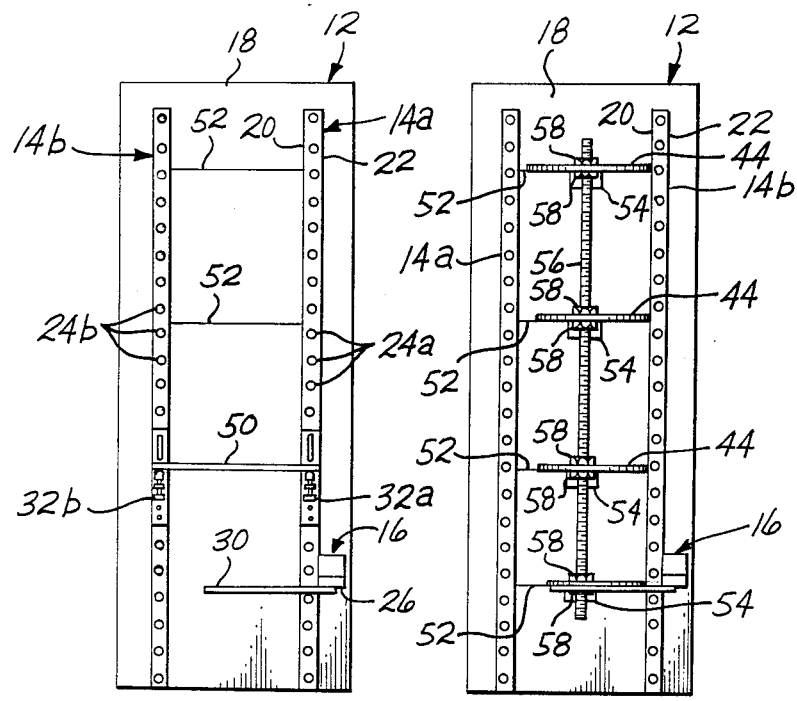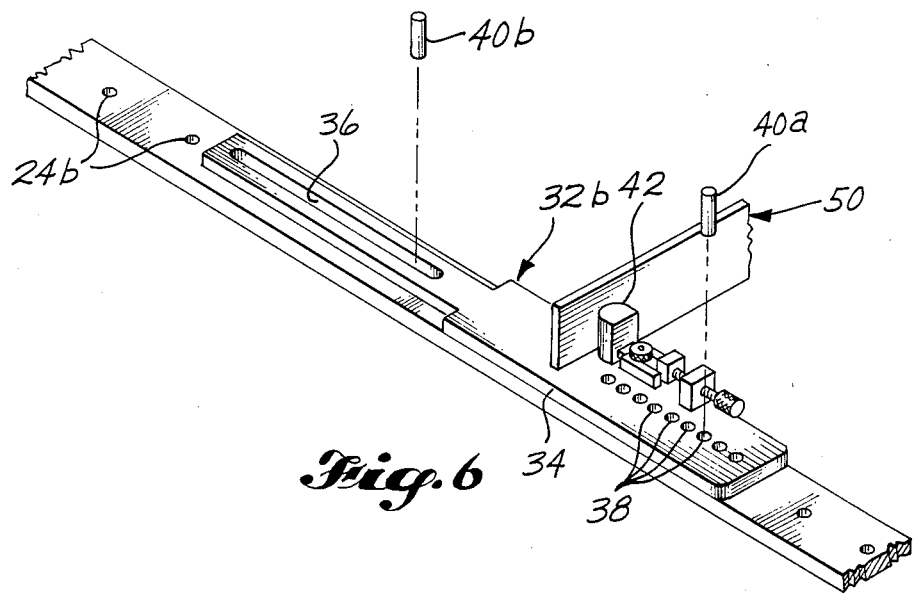

TOOLING FOR AND METHOD OF FABRICATING MASTER MODELS

BACKGROUND OF THE INVENTION

In making master models for large complex shaped parts it is common practice to use a series of headers each accurately machined and accurately located. A filler material is then placed between the headers and the exterior contoured using the headers as reference. Header alignment is normally accomplished by use of optical instruments. These instruments provide alignment to a high degree of accuracy, however, it requires highly skilled personnel and is time consuming. It was found the headers can be aligned, by the use of new tooling, to the same high degree of accuracy, and it can be accomplished with a considerable time savings while using less skilled personnel by practicing the art of this invention.

SUMMARY OF THE INVENTION

A base surface is machined flat to a close tolerance and is leveled. A pair of index bars are secured to the base with the bars parallel to each other and one of the bars having one side acting as a buttock line. The bars also have matching indexing along the length for identifying and scribing header locations on the base.

DESCRIPTION OF THE DRAWINGS

FIG 4 shows a plan view of FIG. 1.

FIG. 5 shows a plan view of the tooling of this invention.

FIG. 6 shows a perspective view of a header station gage.

DETAILED DESCRIPTION

Figure 3:
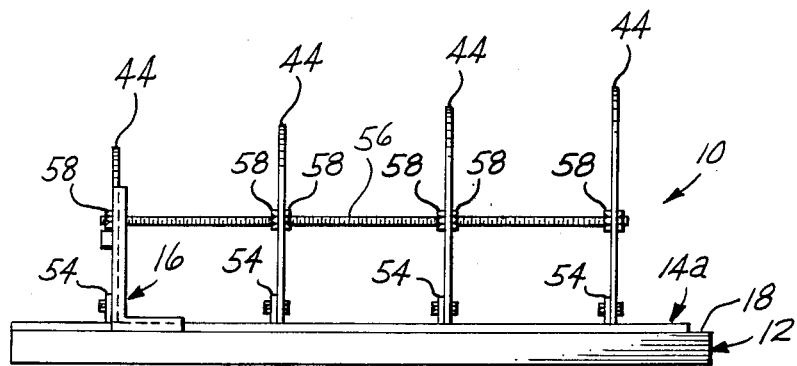
FIG. 3 shows a side elevational view of FIG. 1.
Figure 2:
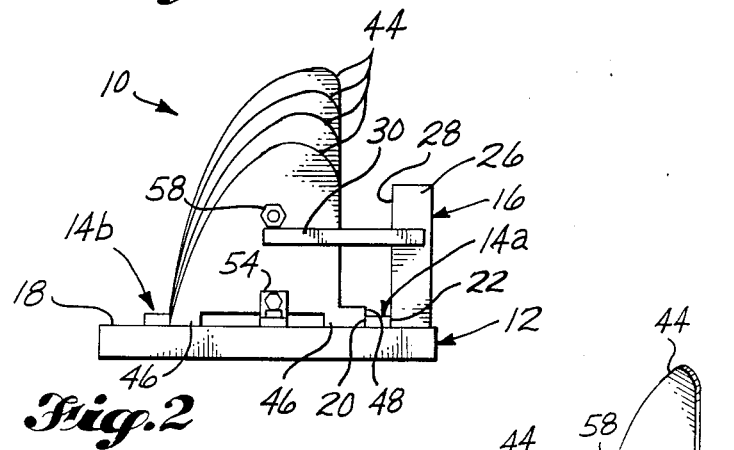
FIG. 2 shows an end elevational view of FIG. 1.
Figure 1:
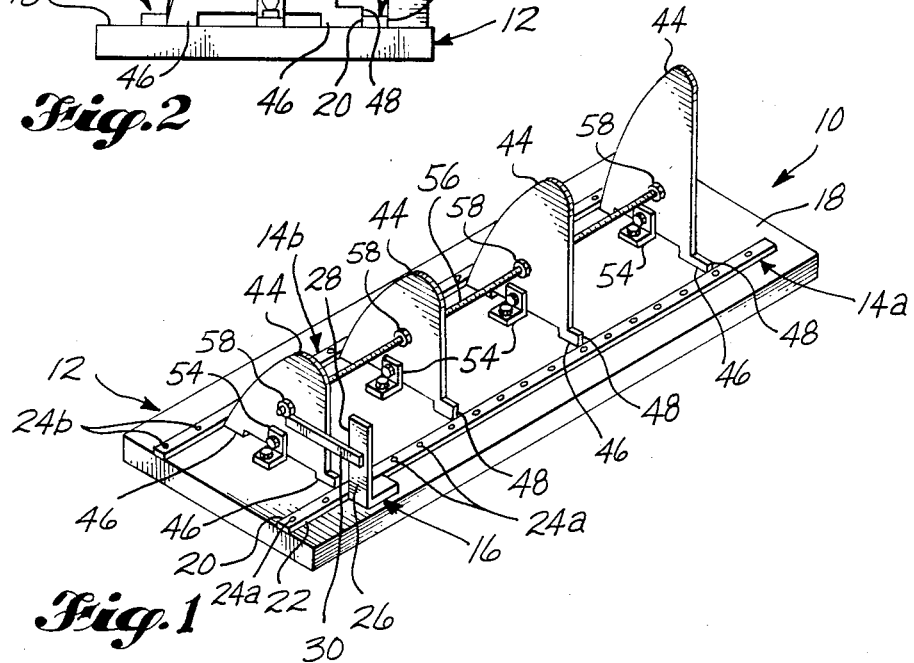
FIG. 1 shows a perspective view of the tooling of this invention with headers of a master model positioned.

Tooling 10 for a master model alignment uses a base 12, a pair of indexing bars 14a and 14b, and a vertical alignment member 16. The top surface 18, of the base must be machined to close tolerance, and that surface leveled preferably to within 0.002 inches to form the base line plane for the tooling. Index bar 14a has vertical side 20, which is machined to a close tolerance, preferably of 0.002 inches to act as a buttock line and or plane. The opposite side 22 is machined to the same tolerance and is parallel to side 20. This bar has a series of holes 24a, which are laid out along a line parallel to the buttock line. These holes are arranged at carefully controlled distances from each other to provide indexing along the length. The second index bar 14b, also has a series of holes 24b, set out along a line parallel to the buttock line. These holes are arranged to match the alignment of the holes in index bar 14a, and each pair of aligned holes in the two bars lie along a line that is perpendicular to the buttock line.

The vertical alignment member 16 may use precision cubes, angles, or sine plates, acting as a pattern, but in this view an angle is used. The angle is shaped such that surface 26 extends vertically from the base plane and perpendicular to the buttock line with side 28 abutting side 22 of index bar 14a. A flat rod 30 is secured to the surface 26 of the vertical alignment member 16 and extends out along a line parallel to the surface of the base and as on extension of surface 26.

A header station gage 32b, has a support member 34, with an elongated slot 36, and a series of in line holes 38. The holes and the slot are all in line and are used in combination with pins 40a and 40b to quick connect securing of the gage to the indexed holes in the index bar 14b. An adjustable curved contact head 42 is located on the support member. That head can be adjusted with respect to the hole locations 38, to permit accurate measurement from the indexed hole locations on the index bar.

A series of headers 44, are each individually contoured with respect to a part 46 of the header, located for contacting the base, and a part 48 of the header, located for contacting the side 20, of the index bar, representing the buttock line.

In using the tooling 10, for aligning the headers 44 one sets up and starts using the tooling as is shown in FIG. 5. The two index bars 24a and 24b are secured to surface 18 of the base 12 with the bars and the holes 24a and 24b of those bars aligned with respect to each other. A pair of header station gages 32a and 32b are placed on the index bars and the curved contact heads 42 adjusted to define an edge of a header location. A bar 50 extends between the two bars. That bar has parallel surfaces along opposite sides that are machined to close tolerances. The bar is held against the contact heads and used as a guide to scribe the header line 52, on the base. Each header location is scribed in this manner. Angle irons 54 are placed along the scribed lines and are then secured to the base. The headers 44 are then positioned against the angle iron with part 46 resting on the base and part 48 abutting against buttock line reference 20, and the header is then secured to the angle iron. The vertical alignment member 16 is then placed in position on the base and along the scribe line with side 28 abutting side 22 of the index bar 14a. The surface of the header is then brought up against flat rod 30 and the header is held in that position with rod 56 and nuts 58. This serves to align the headers vertically.

Figure 7:
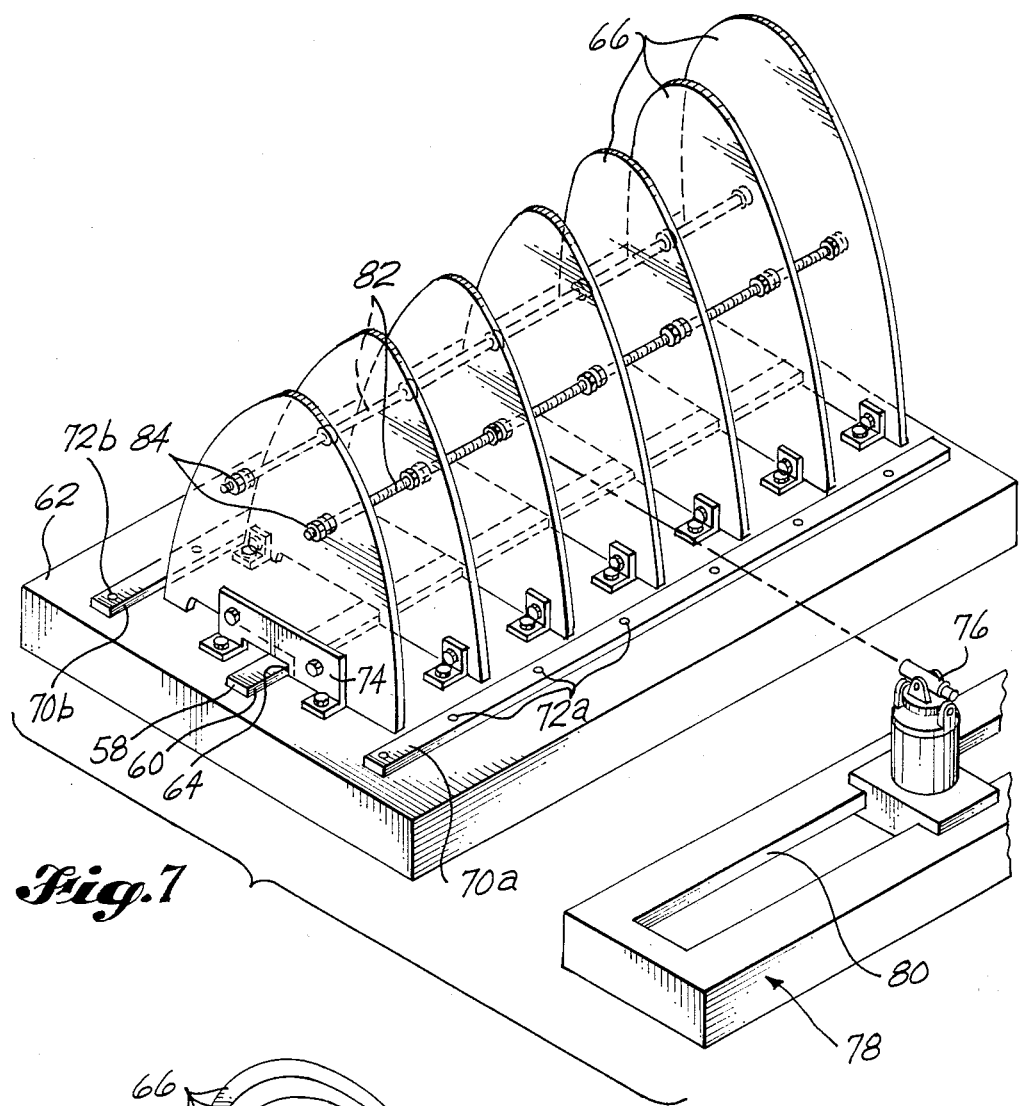
FIG. 7 shows a perspective view of a different embodiment of the tooling of this invention, with headers of a master model positioned.
Figure 8:
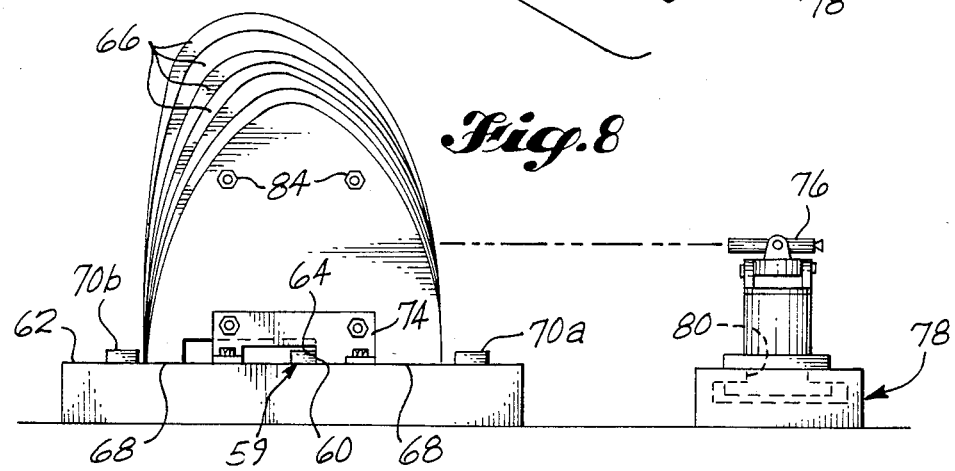
FIG. 8 shows an end elevational view of FIG. 7.

FIGS. 7 and 8 show a different embodiment where an index bar 59, having an accurate side 60 to act as a buttock line, is located on an accurately machined and leveled base 62, and the buttock line is located to contact an interior surface 64 of headers 66. These headers are each machined in reference to the surfaces 68 contacting the base, and the buttock referenced interior surface. An additional pair of index bars 70a and 70b are located on the base and alongside the headers. These additional bars each have a row of in line indexing holes 72a and 72b which are aligned parallel to the buttock line, match each other and are aligned with matching pairs of holes extending perpendicular to the buttock line.

In this embodiment the three indexing bars are aligned and secured to the base. A pair of header station gages 32 are used as before in conjunction with index bars 70a and 70b to scribe header locations on the base. Angle irons 74 are then located along the scribe lines, the headers 66 positioned to contact the angle irons, the base and the buttock line reference 60, and the headers secured to the angle iron. These headers may be vertically aligned as before, however, if the headers are long it is preferable to vertically align using an optical instrument 76. This optical instrument is preferably mounted on a structure 78, that has a track 80 that is leveled and that extends parallel to the buttock line as indicated by side 60 of index bar 59. This provides for moving the instrument to a position to sight in and set the vertical alignment and the headers are then secured in position with threaded bars 82 and nuts 84.

I claim:

1. Tooling for aligning a master model comprising: a base having an upper surface machined to a close tolerance, an index bar secured to the upper surface of the base with the bar having at least one edge machined to define a buttock line for a series of headers each machined with respect to a base line buttock line for alignment with the tooling base and index bar, a second index bar aligned with respect to the first index bar, means using the index bars for spacing the headers along the upper surface of the base, and means for vertically aligning the positioned headers for making up a master model.

2. Tooling for aligning a master model as in claim 1 wherein the means for using the index bars for spacing the headers comprises: an aligned reference point on each index bar, means for lengthwise measurement from the aligned reference point along each bar for establishing header locations, and means extending between bars for acting as a template at each header location.

3. Tooling for aligning a master model as in claim 2 wherein the means for vertically aligning the positioned headers comprises: an outer edge of one of the index bars aligned parallel with the buttock line defining edge on the primary index bar, a pattern shaped to define a header in vertical alignment with the pattern resting on the base and contacting the outer edge of the aligned index bar, and an arm to extend from the pattern to be contacted by and to align the header.

4. Tooling for aligning a master model as in claim 2 wherein the means for vertically aligning the positioned headers comprises: means for positioning an optical instrument for sighting along the base line of a header.

5. Tooling for aligning a master model as in claim 1 wherein the means for using the index bars for spacing the headers comprises: a reference hole in each index bar and the holes aligned with respect to each other, the first index bar having a series of holes accurately spaced with respect to the reference hole and aligned parallel to the buttock line, the second index bar having a series of holes identically aligned as to the holes in the first index bar, a header station gage for mounting in the holes of each index bar, and means for extending between gages for scribing header locations on the base.

6. Tooling for aligning a master model as in claim 1 further comprising: a third index bar sligned with respect to the index bar, and the second and third index bars are located alongside the header locations and are the index bars used for spacing the headers.

7. Tooling for aligning a master model as in claim 6 wherein the means for using the index bars for spacing the headers comprises: an aligned reference point on each index bar, means for lengthwise measurement from the aligned reference point along each bar for establishing header locations, and means extending between bars for acting as a template at each header location.

8. Tooling for aligning a master model as in claim 7 wherein the means for vertically aligning the positioned headers comprises: an outer edge of one of the index bars aligned parallel with the buttock line defining edge on the primary index bar, a pattern shaped to define a header in vertical alignment with the pattern resting on the base and contacting the outer edge of the aligned index bar and an arm to extend from the pattern to be contacted by and to align the header.

9. Tooling for aligning a master model as in claim 7 wherein the means for vertically aligning the positioned headers comprises: means for positioning an optical instrument for sighting along the base line of a header.

10. Tooling for aligning a master model as in claim 6 wherein the means for using the second and third index bars for spacing the headers comprises: a reference hole in each index bar and the holes aligned with respect to each other, the second index bar having a series of holes accurately spaced with respect to the reference hole and aligned parallel to the buttock line, the third index bar having a series of holes indentically aligned as to the holes in the second index bar, a header station gage for mounting in the holes of each index bar and means for extending between gages for scribing header locations on the base.

11. A method of aligning headers for a master model, with steps comprising: utilizing a flat surface as a base, placing an index bar on the base with one side of the bar establishing a buttock line, machining a series of headers to shape with reference to the base and buttock line, placing a second index bar on the base and aligning it with respect to the first index bar, establishing header locations along the base by utilizing the index bars, placing the headers on the base and against the buttock line and along the established header locations and securing the headers to the base, and aligning the headers vertically and securing them in position with respect to each other for forming master models 12. A method of aligning headers for a master model as in claim 11 wherein establishing header locations along the base by using the index bars comprises the steps of: determining a reference point for each index bar, measuring header locations from that point, placing a straight edge member between the measured locations and scribing the header locations on the base.

13. A method of aligning headers for a master model as in claim 11 wherein establishing header locations along the base by using the index bars comprises the steps of: establishing a reference point for each index bar, locating a series of holes at similar predetermined distances from the reference point along each index bar, utilizing header station gages on the referenced holes in the index bars for establishing header locations, placing a straight edged rod between the gages and scribing header locations on the base.

14. A method of aligning headers for a master model as in claim 13 wherein aligning the headers vertically comprises positioning a pattern on the base with one side abutting an index bar and a second side aligning on a scribed header line and extending vertically, moving the top of the positioned header until it contacts an arm of the pattern located as an extension of the vertically extending surface of the pattern, and securing the header in position.

15. A method of aligning headers for a master model, with steps comprising: utilizing a flat surface as a base, placing an index bar on the base with one side of the bar establishing a buttock line for an interior part of a master model, machining a series of headers to shape with reference to the base and the buttock lines placing a pair of index bars on the base and parallel to the buttock line, locating matching indexing on the pair of index bars, using the indexing for locating header positions on the pair of index bars and scribing the header positions on the base based on this positioning, placing the headers on the base and against the buttock line and along the scribed line, securing the headers to the base, and aligning the headers vertically and securing them in position for forming master models.

16. A method of aligning headers for a master model as in claim 15 wherein aligning the headers vertically comprises, placing a pattern indexed by contacting a side of one of the index bars while aligned on a header scribed line, and moving the upper end of the header into contact with the pattern.

17. A method of aligning headers for a master model as in claim 15 wherein aligning the headers vertically comprises positioning an optical instrument, and moving the header into the line of sight and securing it there.

* * * * *